May 30, 1967  J. H. GIVEN  3,321,805
DIE ASSEMBLY
Filed Dec. 7, 1965  3 Sheets-Sheet 1
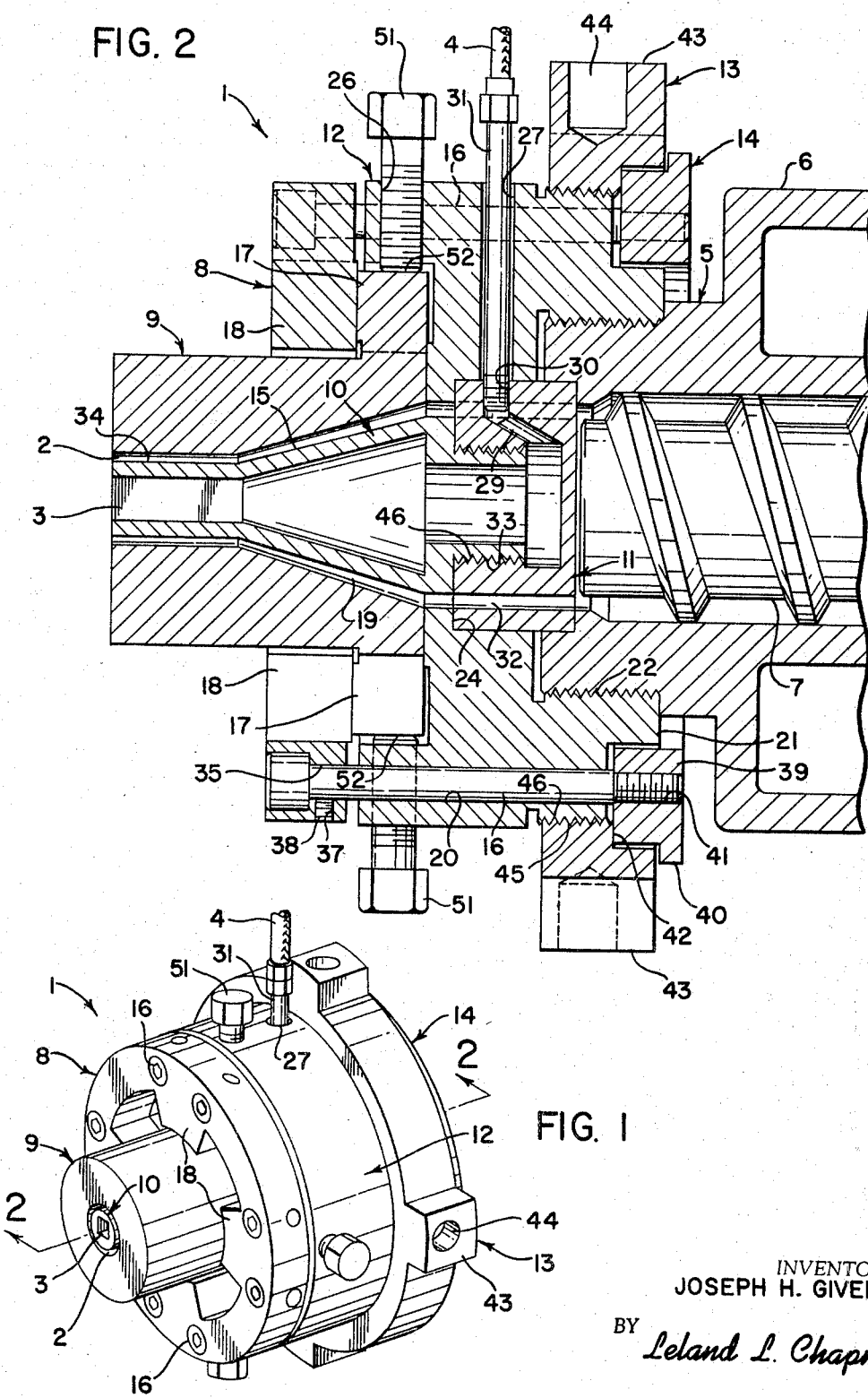
INVENTOR.
JOSEPH H. GIVEN
BY *Leland L. Chapman*
ATTORNEY

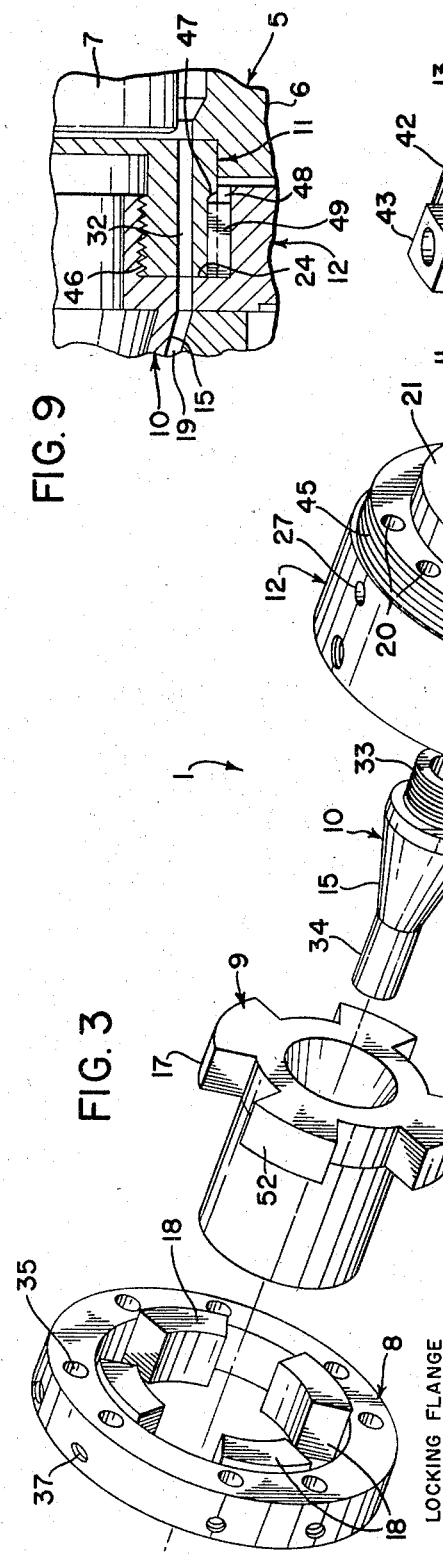
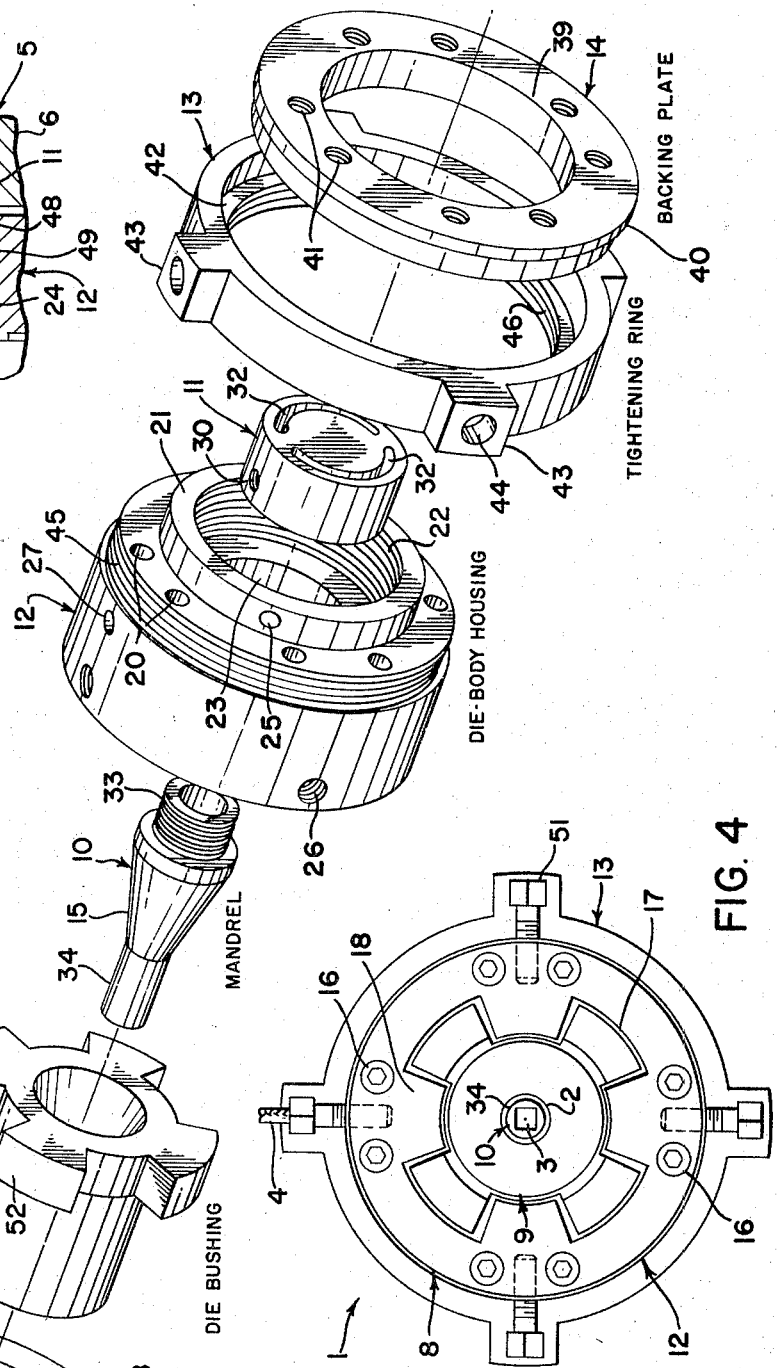

May 30, 1967 J. H. GIVEN 3,321,805
DIE ASSEMBLY
Filed Dec. 7, 1965 3 Sheets-Sheet 3
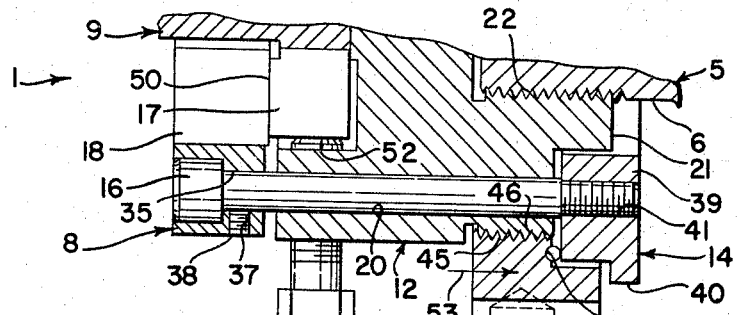
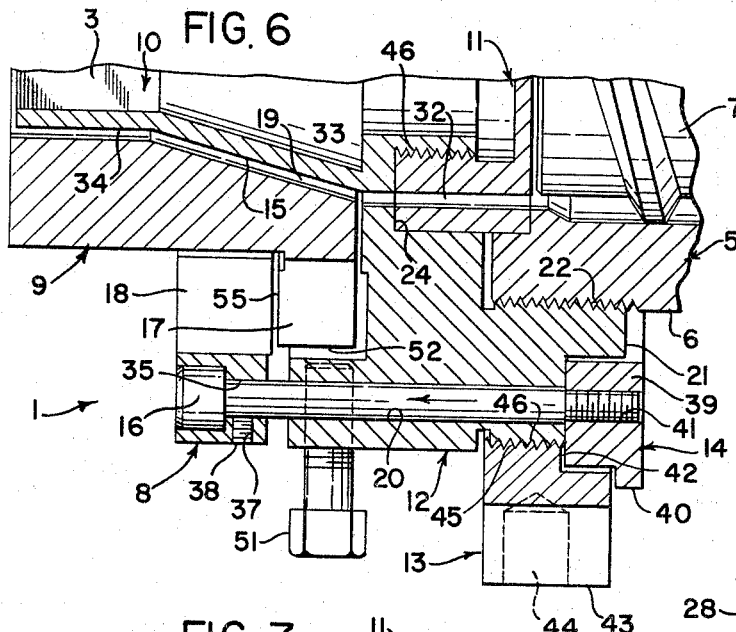
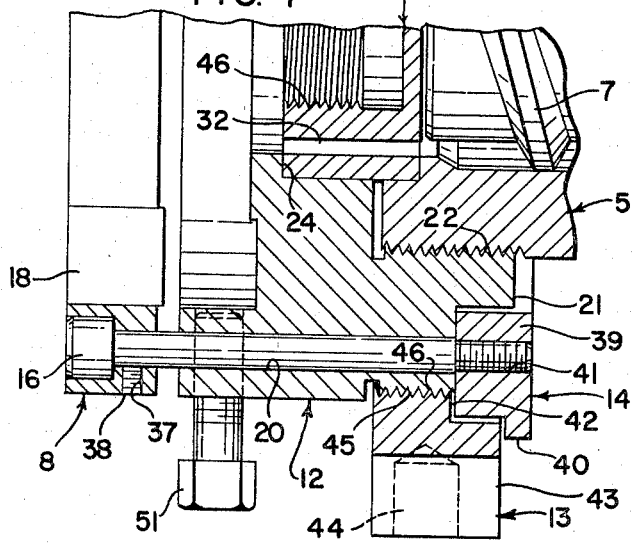
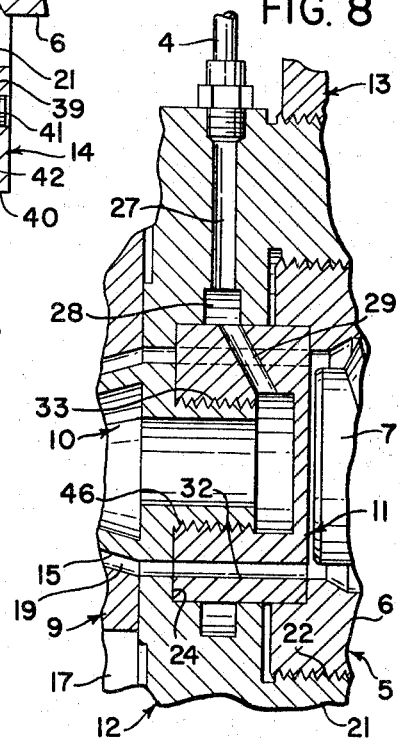
INVENTOR.
JOSEPH H. GIVEN
BY *Leland L. Chapman*
ATTORNEY

United States Patent Office 3,321,805
Patented May 30, 1967

3,321,805
DIE ASSEMBLY
Joseph H. Given, Pompano Beach, Fla., assignor to The Plastex Company, Columbus, Ohio, a corporation of Ohio
Filed Dec. 7, 1965, Ser. No. 512,099
10 Claims. (Cl. 18—14)

This invention relates to a process for the molding of continuous extruded plastic shapes and to a novel extrusion apparatus and is particularly concerned with a particular relationship between the die-carrying head and the body of the body of the extrusion apparatus, and the relationship between parts of the die-carrying head. The present invention permits the speedy replacement of one die, or a part thereof, by another in an extrusion apparatus without substantially interrupting the operation of the extrusion machine, thus effecting a material saving in time, as well as precluding the loss of much valuable plastic which normally has to be scrapped following the usual machine shutdown which accompanies a changing of a part or removal of the die.

The commercial extrusion molding of thermoplastic substances such as the synthetic and natural plastics including polyethylene, polypropylene, polystyrene, polyurethanes, polyesters, polycarbonates, polyalcohols, polyvinyl halides, polyacrylates, polymethacrylates, polyamides, ABS resins, cellulose derivatives and gutta percha, and rubbers including polybutadiene, polyisoprene, polychloroprene, SBR, nitrile rubbers, ethlyene-propylene copolymers and terpolymers, polyurethanes and natural rubber, is a well-known art requiring heavy-duty extrusion presses capable of generating enormous pressures directed toward producing a relatively small article of critical dimensions. The economics of manufacturing such articles demand that they be produced as rapidly as possible by a machine that seldom stops producing and does so without making an appreciable quantity of scrap, and particularly scrap which cannot be further utilized.

In normal operation, because of such severe usage, extruders are fitted with very heavy, critically adjustable dies assemblies which are bolted securely onto the die-carrying head of the press. When the die assembly, or any part thereof, loses its "set" and has to be adjusted, or is worn, or has to be replaced by another of a different size or shape, the operation of the extruder is normally discontinued. This "down time" is not only reflected in a loss of production but also serves to cook the thermoplastic material remaining in the body of the extruder. As a result, the plastic material remaining in the extruder is often degraded and discolored, and when operation of the extruder is resumed, this material often has to be removed from the extruder with difficulty and discarded. Many heat-sensitive thermoplastic materials, such as polyvinyl chloride, degrade so rapidly during down time that an extensive "cleaning out" procedure must be undertaken before normal production is resumed.

An object of this invention is to provide an extrusion die assembly which can be both quickly assembled as well as removed from the head of the extruder.

Another object of this invention is to provide an extrusion pipe-die assembly, parts of which may be interchanged on the extruder and accurately positioned without shutting down the extrusion operation for more than a short time.

A further object of the invention is to provide a process for the extrusion of various plastic shapes, and tubular plastic shapes in particular, using a remarkably flexible and easy to use die-assembly adapted for use on the body of any conventional extruder. Stated differently, the instant invention enables one to operate an extruder substantially continuously and to interchange extruder die assemblies or parts thereof within about 40 minutes as opposed to more than two hours by conventional "quick-change" means now popular in the industry.

It is not essential, to practice this invention, that the extruded plastic shape be tubular, nor is it essential that the parts comprising the die assembly be cylindrical. However, for the sake of simplicity, the description immediately following concerns the extrusion of tubular plastic pipe using a preferred embodiment of the invention. It will be shown subsequently how shapes other than tubular may be extruded, and less preferred embodiments of the invention will also be described.

The preferred embodiment of the invention may be better understood by reference to the accompanying drawings for a die assembly to extrude plastic pipe in which:

FIG. 1 is an overall view of the die assembly fully assembled. The extruded article is expressed through the front (or left-hand end of FIG. 1). Mounting means at the rear (or right-hand end of FIG. 1) are used to mount the die assembly on the body of any conventional extruder FIG. 2 is a section view of the die assembly on the line 2—2 of FIGURE 1 together with a sectional view of a fragmentary portion of that part of the extruder body normally referred to as the extruder "head."

FIG. 3 is an exploded view of the die assembly.

FIG. 4 is a front end (or left-hand end of FIG. 1) view of the die assembly fully assembled.

FIG. 5 is a fragmented section detail of a portion of the die assembly in the "locked-in" or operational position.

FIG. 6 is a fragmented section detail of a portion of the die assembly in the "release" position, and a section detail of a portion of the extruder head showing a preferred means of mounting the die assembly on the extruder head.

FIG. 7 is a fragmented section detail of a portion of the die assembly in the "release" position with two of the parts removed and awaiting replacement.

FIG. 8 is a view of the apparatus partly in section and with parts broken away, depicting a preferred means for introducing a fluid into the central portion of the die assembly.

FIG. 9 is a fragmented section detail of a portion of the die assembly showing a preferred keying embodiment used in the assembly.

Referring again to FIG. 1, the die assembly 1 depicted is for plastic pipe which is expressed through the annular orifice 2 in the front end of the die assembly. The annular orifice 2 encircles a fluid duct 3, normally used for introducing air into the extruded pipe. This air serves both to cool the interior surface of the hot, extruded pipe, as well as to cushion the still-soft pipe and keep it from collapsing. The air inlet duct 4 communicates with the air duct 3 within the die assembly 1.

The exploded view of the die assembly in FIG. 3 comprises a locking flange 8, a die-bushing 9, a mandrel 10, a spider 11, a die-body housing 12, a tightening ring 13 and a backing plate 14. The mandrel 10 is centered within the die-body housing 12 so as to form an annular space into which is distributed the hot plastic mass flowing through and from the periphery of spider 11. Prior to operation, the pipe-die assembly 1, as shown in FIGURE 1, is assembled in the following manner: The spider 11 (FIG. 3) is slidably fitted and thereby centered within the rear of the die-body housing 12 (right-hand end of FIG. 3). The mandrel 10 is screwed into the spider 11 so that the conical body 15 of the mandrel 10 protrudes forwardly from the die-body housing 12 while the spider 11 is held within the die-body housing 12. The tightening ring 13 is started on thet hreads of the die-body housing 12 and the backing plate 14 is slidably fitted into the tightening ring 13. The locking flange 8 is placed against the forward face of the die-body housing 12 and the several ground bolts 16 (FIG. 2) are fitted through the locking flange 8, through the periphery of the die-body housing 12, and threaded through the backing plate 14 into the head 5 of the extruder. The castellated flange 17 of the die bushing 9 is advanced through the interruptions 18 in the locking flange 8 till the castellated flange 17 is behind the locking flange 8, and then the die-bushing 9 is given a fraction of a turn so that at least a part of the locking flange 8 overlaps the castellated flange 17. The ground bolts 16 are then rotated to give a predetermined adjustment to the pipe-die assembly 1, this adjustment being so calculated as to allow the entire assembly to be rigidly locked into position with a turn of the tightening ring 13.

The following detailed description will be more easily understood if the appended drawings are referred to.

To initiate the extrusion operation, thermoplastic material in granular, powder or tape form is loaded into the hopper of the extruder, heated within the extruder to suitable extrusion temperatures and then forced, by the worm 7 (FIG. 2) of the extruder or expressed by the ram of a conventional extrusion press, through the head 5. From the head 5 of the extruder, the heat-softened plastic mass is forced through the peripherally ported spider 11, through the annular passage 19 between the mandrel 10 and the die-bushing 12 to emerge as a continuous tubular-shaped body. Meanwhile, air is internally introduced into the tubing through the air duct 3 in the forming mandrel and is retained in the extruded pipe as it issues from the annular orifice 2 of the ide assembly 1. The body of the press comprising the cylinder and its screw, and means for rotating the screw, together with any means for feeding raw material to the cylinder, are known features, and do not require further description.

The die assembly 1 is disposed on the head 5 (FIG. 2) of the extruder and comprises a cylindrical annular die-body housing 12 (FIG. 3) with screw threads 45 cut in the surface of the rearward end (the right-hand end, nearest the head 5 of the extruder as seen in FIG. 2). Holes 20 (FIG. 3) for bolts 16 (FIG. 2) are drilled through the die-body housing 12 (FIG. 3), the holes 20 being spaced in a predetermined pattern near the periphery and horizontal to the axis of the die-body housing 12 so that when the bolts 16 (FIG. 2) are in position they encircle an annular ring 21 (FIG. 3) which is part of the die-body housing 12.

The annular ring 21 is interiorly screw-threaded and the threads 22 extend continuously a predetermined distance into the interior of the annular die-body housing 12. Interiorly, the die-body housing 12 has a cylindrical opening machined to accommodate the spider 11 which is slidably fitted into it and which comes into face-to-face abutment with a step 24 (FIG. 6) at the end of the cylindrical opening 23 (FIG. 3). Holes 25 (FIG. 3) are provided, at diametrically opposite ends, in the annular ring 21 so the axes of the holes are in the same line and normal to the horizontal axis of the die-body housing 12. Four threaded holes 26 are provided, equi-distantly spaced about the exterior surface and near the delivery or forward end of the die-body housing 12 (the left-hand end as seen in FIG. 1) so that the axes of the four screw-threaded holes 26 are normal to the horizontal axis of the die-body housing 12. Additionally, another hole 27 (FIG. 3) is provided in the die-body housing 12, with its axis normal to that of the die-body housing 12 and about half way along the length of the die-body housing 12. This hole 27 serves as an air duct which communicates with an annular recess 28 (FIG. 8) cut into the wall of the cylindrical opening 23 (FIG. 3). This recess 28 acts as a manifold for incoming air and communicates with an air duct 29 (FIG. 8) in the spider 11. Alternatively, in another embodiment of the instant die assembly, the air duct 27 in the die-body housing 12 may be aligned with a threaded hole 30 (FIG. 2) in the spider 11 and an air line 31 (FIG. 2) passed through the die-body housing 12 and screwed into the spider 11. The former embodiment using the recess 28 as a manifold is preferred as it avoids the tedious procedure of aligning with precision the air duct 27 in the die-body housing 12 and the threaded hole 30 (FIG. 2) in the spider 11.

The recessed ridge or step 24 (FIG. 6) within the die-body housing 12 serves to seat and center the spider 11. The spider 11 carries centrally the mandrel 10 rigidly threaded into it and toward its periphery the mandrel 10 is ported to allow plastic material impelled by the extrusion screw 7 to pass from the cylinder chamber of the extruder through ports 32 (FIG. 3) to the pipe-forming die assembly 1. The spider 11 (FIG. 8) additionally is provided with an air duct through its wall in either of the embodiments explained above. It will be noted that in this preferred embodiment of the spider 11, that is using the recess 28 as an air manifold, the air duct 29 may be easily drilled at the desired angle, while in the less preferred embodiment, that is, precisely positioning the threaded hole 30 (FIG. 2) with the air duct 27 so the air line 31 may be threadedly attached to the spider 11, the air duct 29 (FIG. 2) has to be drilled at a steep angle, then plugged for a portion of its length after the hole 30 is drilled and tapped. A cylindrical cavity 46 (FIG. 7) is machined from the forward face (the left-hand end of FIG. 7) of the spider 11. This cavity 46 is closed at the rear as it does not extend all the way through the spider 11, but stops short of the rear face of the spider 11. Threads are provided over most of the length of the cavity 46 so that the mandrel 10 may be threaded into it.

In most cases, the high extrusion pressure generated in conventional extruders will suffice to lock the spider 11 in position against the step 24 (FIG. 6) in the die-body housing 12 (FIG. 3). On occasion, however, it is necessary to ensure that the spider 11 does not rotate as this would contribute to the production of scrap. Accordingly, both the spider 11 and the die-body housing 12 are provided with matched sunken keyways 47 and 48 respectively (FIG. 9) designed to accommodate a key 49 (FIG. 9).

The mandrel 10 (FIG. 3) is of a generally conical shape and extending from the base of the cone 15 is a screw-threaded hub 33 by means of which the mandrel 10 is rigidly and securely mounted in the spider 11. The narrow end of the cone 15 merges into a short cylindrical section 34, the interior of this section 34 being a hollow rectangular passage 3 (FIG. 1) which serves a dual function, namely, it affords purchase for a tool for servicing and during operation provides an air duct. This air duct 3, continues through the length of the mandrel, though not necessarily still rectangular in shape, along the horizonal axis of the mandrel 10. The mandrel 10 is centrally positioned within a die-housing 9 so that an annular space 19 (FIG. 2) of uniform width surrounds the mandrel 10, and in particular, the cylindrical end 34 of the mandrel must be precisely centered within the die-bushing 9 if a criterion of product quality is uniformity of the wall thickness in the finished plastic pipe.

The die-bushing 9 is a hollow cylinder interiorly tapered to form an annular space 19 (FIG. 2) of uniform width around the mandrel 10, with a castellated flange 17 (FIG. 3) projecting normal to the outer surface and towards the rearward end. The locking flange 8 (FIG. 3) is disposed upon the forward end of the die-body housing 12. Holes 35 are drilled near the periphery of the locking flange 8, the axes of these holes being parallel to the horizonal axis of the locking flange 8 and corresponding to the axes of the holes 36 in the die-body housing 12 and the backing plate 14. Interiorly this locking flange 8 is incomplete and interrupted in such a manner that the castellated flange 17 will slip between the interruptions 18. The thickness of the castellated flange 17 is predetermined so that it will lock behind the interruptions 18 of the locking ring 8 within the die-body housing 12 when the pipe-die assembly 1 is properly assembled. Small holes 37 drilled and tapped for screws in the circumference of the locking flange 8, so that each screw-threaded hole 37 communicates with the holes 35 for the assembly bolts and the communicating holes 35, 37 are normal to one another.

The backing plate 14 is an annular ring 39 (FIG. 6) with a flange 40. Threaded holes 41 (FIG. 3) are provided in the face of the annular ring 39 at predetermined positions so that the axes of these screw-threaded holes 14 correspond to the axes of the assembly bolt holes 36 in the die-body housing 13 (FIG. 3). The annular ring 39 of the backing plate 14 is of overall diameter less than the inside diameter of the tightening ring 13, and in assembly a step 42 (FIG. 6) machined in the inside surface and towards the rear of the annular tightening ring 13 comes to face-to-face abutments with the face of the annular ring 39 of the backing plate 14. In a preferred embodiment, the high frictional resistance generated by the rubbing surfaces of the tightening ring 13 and the backing plate 14 is greatly decreased by a race of bearings embedded in either the face of the annular ring 39 or in the step 42 of the tightening ring 13.

The tightening ring 13 is an annular ring with lugs 43 (FIG. 3) disposed at predetermined positions upon the outside surface of the annular tightening ring 13. Each lug is provided with a hole 44 which will afford purchase for a tool to tighen the ring 13. The tightening ring 13 is undercut for about one-half its cylinderical height so the annular ring 39 of the backing plate 14 slidably fits into the undercut tightening ring 13. The stepped-up section 46 of the tightening ring 13 is threaded so that it can be threaded onto the matching screw-threads 45 cut into the circumferential surface and toward the rear of the die-body housing 12. Lubricating means, such as "zerk" grease fittings, are provided on the tightening ring 13.

FIG. 5 is a fragmented section detail showing the relative positions of the pipe-die assembly components in the "locked-in" operational position. Assembly bolts 16, preferably "ground" bolts which are threaded only near their ends, are inserted through the locking flange 8 and the die-body housing 12 and threadedly secured to a backing plate 14. The spatial relationship between the locking flange 8 and the backing plate 14 is such that the castellated flange 17 of the die-bushing 9 can be inserted through the interruptions of the locking flange 8 and rotated slightly so that the interruptions 18 at least partially overlap the castellated flange 17. Any convenient amount of horizontal play of the die-bushing prior to being "locked-in" may be used. More preferred is an axial horizontal play of from about 0.010 inch to about 0.060 inch.

The annular tightening ring 13 is then tightened by rotating the lugs 43 in the direction of the arrow, namely, anti-clockwise facing the pipe-die assembly from in front of the extruder, till the entire assembly is locked into place. Screws 38 are forced against the ground bolts to secure them in adjustment. With proper adjustment, it will be apparent that the pipe-die assembly can be locked or unlocked as desired by any predetermined fraction of a turn, or by any convenient number of turns.

"Fine adjustment" bolts 51 (FIG. 5) are threadedly retained within the die-body housing 13, and the ends of these bolts 51 abut against the circumferential surface at points 52 of the castellated flange 17 so that the die-bushing 9 (FIG. 3) may be axially so precisely positioned in relation to the mandrel 10 that the plastic pipe being extruded from the annular orifice 2 (FIG. 1) has uniform wall thickening.

While the die-assemly 1 is being tightened into the "locked-in" position by rotating the tightening ring 13 in the direction of arrow 43, the ring 13 moves relative to the die-body housing 12, in the direction of arrow 53. Meanwhile, great pressure is exerted on the face of the annular ring 39 of the backing plate 14. Occasionally the frictional force due to the pressure is so great as to tend to bind the surfaces of the ring 39 and that of the step 42 inside the tightening ring 13 (FIG. 3). Accordingly, it is preferred to interpose a ball-bearing race 54 between these surfaces and it is found that this ball-bearing race decreases the frictional force greatly, affords a means of evenly distributing the pressure which, in turn, causes the die-bushing to be secured in place accurately.

FIG. 6 is a fragmented section detail showing the relative positions of the pipe-die assembly components in the "release" position. The relative positions of the castellated flange 17 of the die-bushing 8, the interruptions 18 of the locking flange 8 and the die-body housing 12, is clearly shown. Note the gap 55 for horizontal play required to dispose the castellated flange 17 behind the interruptions 18 of the locking flange 8. "Fine adjustment" bolts 51 are shown in the "out" position prior to locating the die-bushing 9 in the desired position.

FIG. 7 is a fragmented section detail of the pipe-die assembly in the "release" position, substantially the same position as that in FIG. 6 described above, except that the mandrel 10 is not threaded into the spider 11, and the die-bushing 9 is not yet disposed in place behind the locking flange 8. Threads provided within the cavity 46 of the spider 11 are clearly shown.

As mentioned hereinabove, locking means other than the tightening ring described in the drawings and specification may be used, such as snap-locks or a sliding-pin lock. The particular locking means chosen would be determined by the size, shape and weight of the die-assembly and also by the extrusion pressure at which it will function. Where extrusion pressures are relatively low or the die-assembly is relatively small, snap-locks may be used. For somewhat heavier duty operations, a sliding-pin lock may be preferred. Both snaplocks and sliding-pin locks have the advantage of substantially eliminating fouling due to plastic material. In addition, the use of snap-locks eliminates the necessity of a tightening ring and makes locking the die-assembly to the extruder head, or releasing it, extremely fast and easy.

It is not essential to practice this invention that the parts of the extrusion apparatus herein disclosed be cylindrical. For example, the die-body housing may be a parallelepiped, generally rectangular in shape, the tightening ring may be a rectangular annular frame into which the die-body housing may be slidably fitted. A slot may be cut in the rectangular annular ring and a groove may be cut at an angle to said slot, and in the surface of the rectangular die-body housing with a sliding pin common to both the slot and the groove, so that urging the pin along the slot and up the inclined groove will urge the die-body housing into a locked position.

It is readily seen from the foregoing description that with one and the same spider, any desired combination of mandrel and die-bushing may be used to produce plastic tubes or plastic pipe of different diameters as well as wall thickness.

It will also be readily recognized that the particular choice of plastic pipe of any particular diameter and wall thickness, made from any of the aforementioned materials, will depend on the particular end use for which the pipe is intended. For example, relatively rigid, relatively large diameter pipe may be used for irrigation of fields and for sewers, for process piping of corrosive chemicals, and similar uses; relatively flexible, smaller diameter pipe is useful for conduit for electrical cables, for buried water sprinkler systems for lawns, and the like. Other extruded shapes are useful for refrigerator trim, molding for walls, and structural members for construction.

I claim:

1. Extrusion apparatus for continuously extruding plastic material in a predetermined configuration, in conjunction with a die-assembly comprising in combination:
  a die-body housing,
  a spider provided with a first passage centrally disposed within said die-body housing,
  a mandrel, axially provided with a second passage, mounted within said spider and centrally disposed within said die-body housing,
  a die-bushing, provided with a generally conical third passage, with a castellated flange at one end, disposed about said mandrel to define a tapered annular extrusion zone and centrally disposed within said die-body housing,
  a locking flange interiorly incomplete with interruptions arrayed in a predetermined manner, disposed about said die-bushing, said interruptions being disposed within said locking flange to permit said castellated flange of said die-bushing to slip through,
  a flanged backing plate in face-to-face abutment with said die-body housing, a portion of said backing plate slidably fitted over a portion of said die-body housing,
  locking means mounted exteriorly on said die-body housing against said backing plate, said combination being bolted together in predetermined spatial relationship with a plurality of bolts passing through the periphery of said locking flange, die-body housing and backing plate whereby a change of die-bushing may be quickly accomplished by releasing said die-bushing by loosening said locking means.

2. Extrusion apparatus for continuously extruding plastic material in a predetermined configuration, in conjunction with a die-assembly comprising in combination:
  a die-body housing,
  a spider provided with a first passage centrally disposed within said die-body housing,
  a mandrel, axially provided with a second passage, mounted within said spider and centrally disposed within said die-body housing,
  a die-bushing, provided with a generally conical third passage, with a castellated flange at one end, disposed about said mandrel to define a tapered annular extrusion zone and centrally disposed within said die-body housing,
  a locking flange interiorly incomplete with interruptions arrayed in a predetermined manner, disposed about said die-bushing, said interruptions being disposed within said locking flange to permit said castellated flange of said die-bushing to slip through,
  a tightening ring threadedly disposed upon said die-body housing,
  a flanged backing plate in face-to-face abutment with said tightening ring,
  adjusting means for spatially disposing said backing plate and said locking flange relative to each other in a predetermined spatial relationship, to permit said die-assembly to be locked into operating position by rotating said tightening ring in one direction and to unlock said die-assembly by rotating said tightening ring in the opposite direction.

3. Extrusion apparatus for continuously extruding pipe from a plastic material, in conjunction with a pipe die-assembly comprising in combination:
  a die-body housing, provided with a first substantially vertical passage extending through one-half the vertical cross-section thereof,
  a spider, provided with a second peripheral passage for distribution of hot plastic material discharged from said extrusion apparatus, and a third substantially vertical passage to duct fluid communicating with said first passage, said spider being centrally disposed within said die-body housing,
  a mandrel, axially provided with a fourth passage communicating with said third passage, mounted within said spider and centrally disposed within said die-body housing,
  a die-bushing, provided with a generally conical fifth passage, with a castellated flange at one end, disposed about said mandrel to define a tapered annular extrusion zone for ducting said hot plastic material and centrally disposed within said die-body housing,
  a locking flange interiorly incomplete with interruptions arrayed in a predetermined manner, disposed about said die-bushing, said interruptions being disposed within said locking flange to permit said castellated flange of said die-bushing to slip through,
  a tightening ring threadedly disposed upon said die-body housing,
  a flanged backing plate in face-to-face abutment with said tightening ring,
  adjusting means for disposing said backing plate and said locking flange in a predetermined spatial relationship to each other to permit said pipe die-assembly to be locked into operating position by rotating said tightening ring in one direction and to unlock said die-assembly by rotating said tightening ring in the opposite direction.

4. The apparatus of claim 3 wherein:
  said first passage is threaded for a predetermined depth from the peripheral surface of said die-body housing to threadedly connect a nipple through which said fluid may be delivered,
  said die-body housing is provided interiorly with a circumferential recess communicating with said first passage, said recess serving as a manifold for said fluid, and
  said third passage communicates with said circumferential recess.

5. The apparatus of claim 3 wherein:
  said die-body housing is provided with a plurality of peripheral horizontal holes and said first passage slidably accommodates a nipple threaded at one end through which said fluid may be delivered,
  said third passage is provided with screw threads for a predetermined depth from the peripheral surface of said spider to afford purchase for said threaded nipple,
  said fourth passage is polygonally shaped at one end to afford purchase for a wrench,
  said die-bushing is positioned by at least two oppositely disposed bolts threaded through said die-body housing,
  said locking flange is peripherally provided with a plurality of holes, for adjusting bolts, corresponding to said peripheral horizontal holes in said die-body housing, said adjusting bolts to be threaded into said backing plate, and
  said tightening ring is provided circumferentially with at least two oppositely disposed lugs for purchase for a tool to rotate said tightening ring.

6. The apparatus of claim 4 wherein:
  said die-body housing is provided with a plurality of peripheral horizontal holes,
  said fourth passage in said die-bushing is polygonally shaped at one end to afford purchase for a wrench,
  said die-bushing is positioned by at least two oppositely disposed bolts threaded through said die-body housing,
  said locking flange is peripherally provided with a plurality of holes, for adjusting bolts, corresponding to said peripheral horizontal holes in said die-body housing, said adjusting bolts to be threaded into said backing plate, and
  said tightening ring is provided circumferentially with at least two oppositely disposed lugs for purchase for a tool to rotate said tightening ring.

7. The apparatus of claim 3 wherein said fluid is air.

8. The apparatus of claim 3 wherein a friction bearing is interposed between said tightening ring and said backing flange.

9. The apparatus of claim 1 wherein the plastic material is polyvinyl chloride.

10. The apparatus of claim 1 wherein said spider is keyed to said die-body housing to prevent rotation of said spider.

References Cited

UNITED STATES PATENTS

| 1,956,330 | 4/1934 | Mullin | 18—14 |
| 2,401,551 | 6/1946 | Cook | 18—13 |
| 2,690,592 | 10/1954 | Schang | 18—14 X |
| 3,146,495 | 9/1964 | Sanford. | |

FOREIGN PATENTS

| 1,267,258 | 6/1961 | France. |

WILLIAM J. STEPHENSON, *Primary Examiner.*